F. J. O'ROURKE.
DOUCHE CAN.
APPLICATION FILED FEB. 6, 1919.
1,347,398.
Patented July 20, 1920.
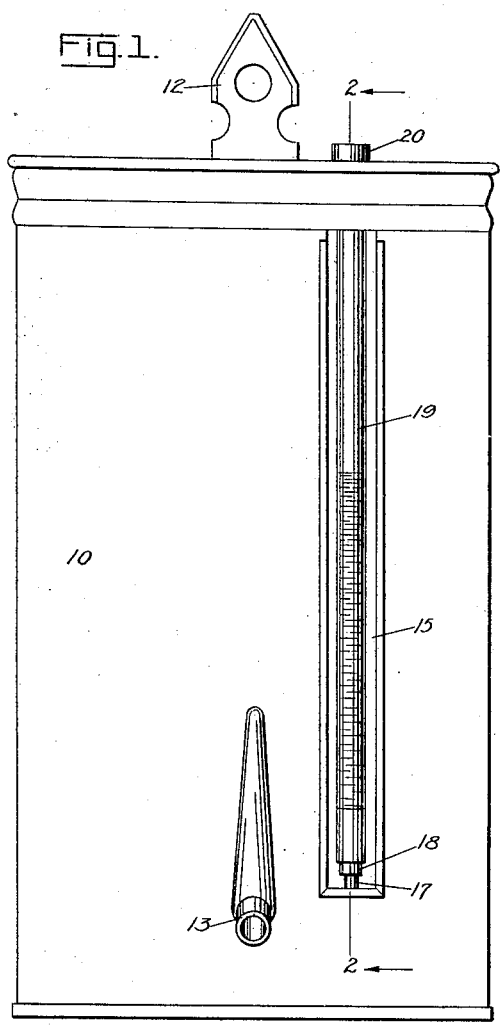
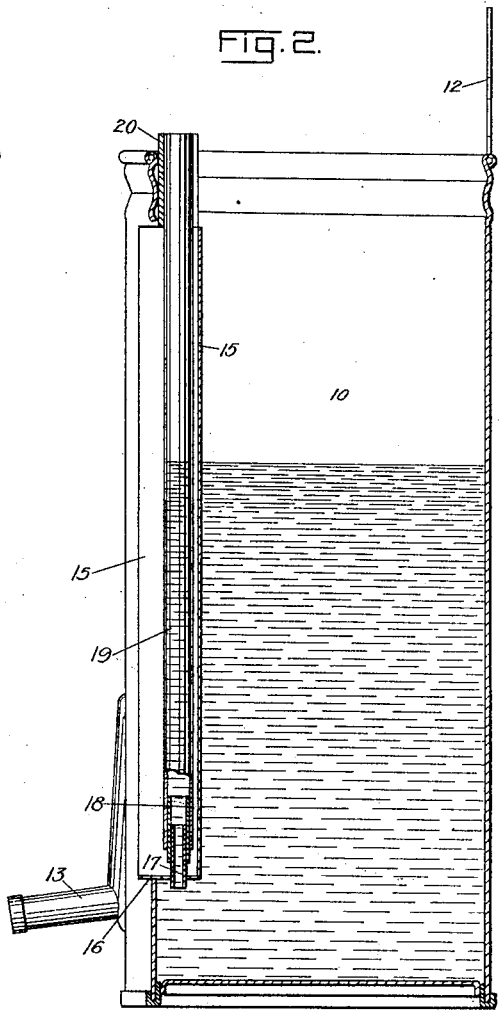
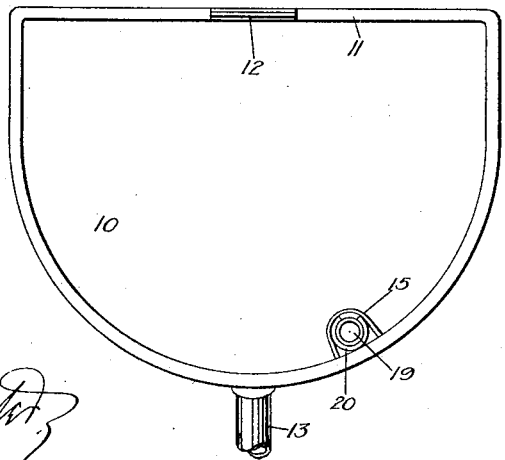
WITNESSES
INVENTOR
FRANK J. O'ROURKE
BY
ATTORNEYS

UNITED STATES PATENT OFFICE.

FRANK J. O'ROURKE, OF NEW YORK, N. Y.

DOUCHE-CAN.

1,347,398.  Specification of Letters Patent.  Patented July 20, 1920.

Application filed February 6, 1919. Serial No. 275,425.

*To all whom it may concern:*

Be it known that I, FRANK J. O'ROURKE, a citizen of the United States, and a resident of the city of New York, Whitestone, borough of Queens, in the county of Queens and State of New York, have invented new and useful Improvements in Douche-Cans, of which the following is a full, clear, and exact description.

The object of the invention is to provide certain new and useful improvements in douche cans provided with diaphanous indicators whereby the user, attendant or other person can see at a glance when the water or medicated liquid contained in the can begins to flow out of the can to the afflicted part and whereby the user, attendant or other person can also gage the amount of liquid discharged from the can. Another object is to protect the diaphanous indicator, which is usually in the form of a glass tube, against accidental injury and to permit of readily replacing such glass gage in case it becomes defective.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a front elevation of the douche can;

Fig. 2 is a vertical section of the same on the line 2—2 of Fig. 1; and

Fig. 3 is a plan view of the same.

The vessel 10 is adapted to contain water or medicated liquid and is preferably provided with a flat back 11 provided with a hanger 12 for supporting the douche can from a hook or other suitable support. The vessel 10 is open at the top and is provided near its lower end at the front with an outlet pipe 13 for engagement with one end of a hose provided at its other end with the usual nozzle or other implement for directing the water or medicated liquid to an afflicted part.

The vessel 10 is provided in its front wall with a niche or recess 15, the bottom 16 of which is located a short distance above the bottom of the vessel 10, and in the said bottom 16 is secured a vertically disposed nipple 17 opening at its lower end into the vessel 10. The upper outer end of the nipple 17 is provided with a rubber sleeve 18 on to which fits the lower end of a glass tube 19 forming an indicator for indicating the height of the liquid contained in the vessel 10. It is understood that the glass tube 19 extends within the niche 15 and hence is readily visible by the user, attendant or other person in charge of the douche can, to enable such person to readily see the height of the liquid in the vessel 10 and to enable such person to see whether the liquid begins to flow out of the vessel 10 or not. The person can also gage the amount of liquid flowing out of the vessel during a given time. The top of the niche 15 is open and located a short distance below the top of the vessel 10. The glass tube 19 projects through the open top of the niche and is provided on its upper end with a protecting tube 20 of rubber or other material engaging the inner face of the upper end of the vessel to hold the glass tube firmly in position and to protect the upper end of the glass tube against accidental injury.

It will be noticed that when the vessel 10 is filled with water and with a medicated liquid and the nozzle or other implement at the end of the hose connected with the outlet tube 13 is applied to the afflicted part and the usual closing device on the hose is opened then the user or the attendant can see at a glance whether the liquid begins to flow out of the vessel 10 or not and can also gage the amount of liquid that has flowed out of the vessel. The indicator tube 19 although preferably made of glass may be made of other diaphanous material.

Having thus described my invention, I claim as new and desire to secure by Letters Patent:—

1. In a douche can, the combination with a vessel open at the top and having an inset wall at its front portion forming a niche over a bottom wall; of a nipple in the niche and opening through the bottom thereof into the vessel, said nipple extending upwardly and being provided with a rubber sleeve, and a diaphanous tube extending in and throughout the length of said niche and having its lower end fitting on the said rubber sleeve and its upper end extending through the upper end of the niche.

2. The combination with a vessel open at the top and provided with a front wall having an inset portion with projecting edges, said inset portion having a closed bottom and open top spaced from the top of the vessel; of a nipple in the niche and opening into the vessel at the bottom of the niche, a glass tube extending in said niche and detachably secured to the nipple, said tubing extending through the upper end of the niche and between the wall of said niche and the front wall of the vessel at the top, and a protecting member incasing the upper end of the glass tube at the front portion of the vessel.

FRANK J. O'ROURKE.